(12) United States Patent
Jeong

(10) Patent No.: US 11,819,927 B2
(45) Date of Patent: Nov. 21, 2023

(54) CUTTING INSERT AND CUTTING TOOL ASSEMBLY INCLUDING SAME

(71) Applicant: TAEGUTEC LTD., Daegu (KR)

(72) Inventor: Chang Won Jeong, Daegu (KR)

(73) Assignee: TaeguTec Ltd., Daegu (KR)

( * ) Notice: Subject to any disclaimer, the term of this patent is extended or adjusted under 35 U.S.C. 154(b) by 354 days.

(21) Appl. No.: 17/345,105

(22) Filed: Jun. 11, 2021

(65) Prior Publication Data

US 2022/0395910 A1      Dec. 15, 2022

(51) Int. Cl.
*B23B 27/16*     (2006.01)

(52) U.S. Cl.
CPC ....... *B23B 27/1611* (2013.01); *B23B 27/1651* (2013.01); *B23B 2200/0433* (2013.01); *B23B 2200/28* (2013.01)

(58) Field of Classification Search
CPC ............. B23B 27/1611; B23B 27/1651; B23B 2200/0433; B23B 2200/28; B23B 2205/16; B23B 2200/082; B23B 2200/087; B23B 2265/32; B23B 27/1644; B23B 2200/04; B23B 2200/0447; B23B 2200/0452
See application file for complete search history.

(56) References Cited

U.S. PATENT DOCUMENTS

| | | | |
|---|---|---|---|
| 5,779,400 A * | 7/1998 | Fountaine | B23B 27/1614 407/103 |
| 6,217,263 B1 | 4/2001 | Wiman et al. | |
| 11,717,895 B2 * | 8/2023 | Choi | B23B 27/1622 407/46 |
| 11,731,203 B2 * | 8/2023 | Choi | B23B 27/1644 407/107 |
| 2005/0214080 A1 * | 9/2005 | Satran | B23C 5/202 407/113 |
| 2014/0286718 A1 | 9/2014 | Scherman et al. | |

(Continued)

FOREIGN PATENT DOCUMENTS

WO    WO-2021095520 A1 *    5/2021    ........... B23B 27/143

OTHER PUBLICATIONS

International Search Report dated Sep. 21, 2022, issued in PCT counterpart application No. PCT/KR2022/008075.

(Continued)

*Primary Examiner* — Sara Addisu
(74) *Attorney, Agent, or Firm* — Womble Bond Dickinson (US) LLP

(57) ABSTRACT

A cutting insert capable of performing front-turning and high feed back-turning according to one embodiment includes: an upper surface; a lower surface opposite to the upper surface in a vertical direction; a side portion configured to connect the upper surface and the lower surface; a mounting hole extending through the upper surface and the lower surface; and a plurality of cutting edges formed at edges where the upper surface meets the side portion, wherein the upper surface has one or more cutting corners, the plurality of cutting edges include a major cutting edge and a minor cutting edge extending from the cutting corner, and a representative inclination of the minor cutting edge used for high feed back-turning is greater than a representative inclination of the major cutting edge used for front-turning with respect to a virtual reference plane perpendicular to the vertical direction.

19 Claims, 14 Drawing Sheets

(56) References Cited

U.S. PATENT DOCUMENTS

| | | | |
|---|---|---|---|
| 2015/0336175 A1* | 11/2015 | Krishtul | B23B 27/143 |
| | | | 407/115 |
| 2018/0147637 A1* | 5/2018 | Gonzui | B23B 27/1611 |
| 2020/0038963 A1* | 2/2020 | Jonsson | B23B 27/141 |
| 2020/0269327 A1* | 8/2020 | Akbari | B23B 27/1603 |
| 2020/0346288 A1* | 11/2020 | Johansson | B23B 27/141 |
| 2021/0114118 A1 | 4/2021 | Choi et al. | |

OTHER PUBLICATIONS

Written Opinion dated Sep. 21, 2022, issued in PCT counterpart application No. PCT/KR2022/008075.

* cited by examiner

CUTTING INSERT AND CUTTING TOOL ASSEMBLY INCLUDING SAME

TECHNICAL FIELD

The present disclosure relates to a cutting insert used for turning a workpiece and a cutting tool assembly including same.

BACKGROUND

Turning is typically a work done on a lathe and mainly refers to a method of cutting the surface of a round-shaped workpiece with a cutting tool while turning the round-shaped workpiece. In such a turning operation, generally, if the entering angle of a cutting insert (i.e., the angle between the cutting edge of the cutting insert and the workpiece surface) is small during back-turning, then the thickness of chips generated from the workpiece becomes thin and drooping chips are generated, thereby causing the chip discharge flow to be unsmooth. Accordingly, in the relevant art, the corner angle of a cutting insert is designed to be small so that the entering angle of the cutting insert can be secured during back-turning.

However, if the corner angle of the cutting insert is small, then the entering angle of the cutting insert increases during front-turning. This is disadvantageous in the front-turning cutting in which a relatively large load is applied to the cutting insert. In addition, if the corner angle of the cutting insert is small, then the upper and lower surfaces of the cutting insert become smaller. As such, when designing the cutting insert, there are many restrictions in securing a space for forming a chip former and inducing chip discharge. In particular, in the case of a double-sided negative cutting insert, the upper and lower surfaces of the cutting insert should also be used as tool mounting surfaces, whereby a greater space restriction occurs when designing the cutting insert. Thus, this is more disadvantageous in terms of securing a space for inducing chip discharge and in terms of securing an area for stable mounting of the cutting insert. Among the conventional cutting inserts used for turning, a cutting insert having a small corner angle is mainly used for profiling. Only the tip portion of such a cutting insert is used during back-turning. Accordingly, the length at which a chip former is formed is very small, thereby making it difficult to use such a cutting insert for high feed back-turning.

SUMMARY

The present disclosure provides a double-sided cutting insert mounted on a non-rotating cutting tool, i.e., a turning tool. Moreover, the present disclosure provides a cutting insert capable of being used for both front-turning and back-turning, and further capable of inducing smooth chip generation and good chip discharge by effectively configuring the shape of a chip former. Furthermore, the present disclosure provides a cutting insert capable of obtaining a chip thickness that does not cause chip drooping and capable of performing high feed back-turning. In addition, the present disclosure provides a cutting insert capable of securing a stable mounting surface and capable of smoothly performing front-turning that receives a large load.

The present disclosure also provides a cutting tool assembly including such a cutting insert.

One aspect of the present disclosure pertains to a cutting insert. The cutting insert capable of performing front-turning and high feed back-turning according to an exemplary embodiment includes: an upper surface; a lower surface opposite to the upper surface in a vertical direction; a side portion configured to connect the upper surface and the lower surface; a mounting hole extending through the upper surface and the lower surface; and a plurality of cutting edges formed at edges where the upper surface meets the side portion, wherein the upper surface has one or more cutting corners, the plurality of cutting edges including a major cutting edge and a minor cutting edge extending from the cutting corner, and wherein a representative inclination of the minor cutting edge used for high feed back-turning is greater than a representative inclination of the major cutting edge used for front-turning with respect to a virtual reference plane perpendicular to the vertical direction.

In one embodiment, the cutting insert includes a first side surface, a second side surface, a third side surface and a fourth side surface. The first side surface and the second side surface may be opposite to each other, while the third side surface and the fourth side surface may be opposite to each other. A pair of cutting corners may be provided on the upper surface. The pair of cutting corners may include a first cutting corner where the first side surface and the third side surface adjacent to each other meet the upper surface and a second cutting corner where the second side surface and the fourth side surface adjacent to each other meet the upper surface. Further, the major cutting edge may include a first cutting edge extending from the first cutting corner and formed at an edge where the first side surface and the upper surface meet, and a second cutting edge extending from the second cutting corner and formed at an edge where the second side surface and the upper surface meet. The minor cutting edge may include a third cutting edge extending from the first cutting corner and formed at an edge where the third side surface and the upper surface meet, and a fourth cutting edge extending from the second cutting corner and formed at an edge where the fourth side surface and the upper surface meet.

In one embodiment, the upper surface may have a rhombus shape, and each of the pair of cutting corners may have a corner angle of 66° or more and 75° or less.

In one embodiment, each of the plurality of cutting edges may have any one of a shape in which a straight and a serration are combined, a shape in which a straight and a curve are combined, a shape in which a plurality of straights are combined, a straight shape and a curved shape.

In one embodiment, the representative inclination of the major cutting edge may be the inclination with respect to the virtual reference plane of a first imaginary line extending from each of the pair of cutting corners to a first vertical line passing through a half-length point of the major cutting edge. Based on the first imaginary line, the sum of area of portions defined by the first imaginary line and the major cutting edge above the first imaginary line may be equal to the sum of areas of portions defined by the first imaginary line and the major cutting edge below the first imaginary line. In addition, the representative inclination of the minor cutting edge may be the inclination with respect to the virtual reference plane of a second imaginary line extending from each of the pair of the cutting corners to a second vertical line passing through a half-length point of the minor cutting edge. Based on the second imaginary line, the sum of area of portions defined by the second imaginary line and the minor cutting edge above the second imaginary line may be equal to the sum of areas of portions defined by the second imaginary line and the minor cutting edge below the second imaginary line.

In one embodiment, the upper surface may include a seat surface and a rake surface, the seat surface may be formed as a planar surface parallel to the virtual reference plane, and the rake surface is formed as a curved surface in which a plurality of valley surfaces and a plurality of ridge surfaces are alternately connected.

In one embodiment, the rake surface may include a front-turning rake surface adjacent to the major cutting edge and a back-turning rake surface adjacent to the minor cutting edge.

In one embodiment, an angle between a corner bisector passing through the pair of cutting corners and an extension line of an intersection of a valley surface and a ridge surface of the front-turning rake surface may be smaller than the angle between the corner bisector and an extension line of an intersection of a valley surface and a ridge surface of the back-turning rake surface.

In one embodiment, a plurality of dot portions spaced apart from each other along an extension direction of the minor cutting edge may be formed on the back-turning rake surface.

In one embodiment, a distance between the minor cutting edge and each of the dot portions may be smaller than a distance between the major cutting edge and a seat surface intersection of the front-turning rake surface.

In one embodiment, a front-turning chip former including a first groove surface inclined downward toward the mounting hole and a second groove surface connected to the first groove surface and inclined upward toward the mounting hole may be formed on the front-turning rake surface, and a back-turning chip former including a third groove surface inclined downward toward the mounting hole and a fourth groove surface connected to the third groove surface and inclined upward toward the mounting hole may be formed on the back-turning rake surface.

In one embodiment, the back-turning chip former may have a length of at least ½ of a length of an edge of the third side surface meeting the upper surface.

In one embodiment, an inclination angle of the back-turning chip former with respect to the virtual reference plane may be larger than an inclination angle of the front-turning chip former symmetrical to a corner bisector passing through the pair of cutting corners.

In one embodiment, a ramp distance of the back-turning chip former may be set to be smaller than a ramp distance of the front-turning chip former symmetrical to a corner bisector passing through the pair of cutting corners.

In one embodiment, the major cutting edge may have an entering angle of greater than 90° with respect to the workpiece, and the minor cutting edge may have an entering angle of less than 30° with respect to the workpiece.

In the above-described embodiments, the upper surface and the lower surface may be mirror-symmetrical about the virtual reference plane.

Another aspect of the present disclosure pertains to a cutting tool assembly. The cutting tool assembly for turning a workpiece according to an exemplary embodiment includes: a cutting insert configured to be usable for both front-turning and high feed back-turning; a tool holder provided at a tip thereof with an insert pocket in which the cutting insert is mounted; and a fixing member configured to fix the cutting insert to the insert pocket of the tool holder, wherein the cutting insert includes an upper surface, a lower surface opposite to the upper surface in a vertical direction, a plurality of side surfaces positioned between the upper surface and the lower surface, and a plurality of cutting edges formed at edges where the plurality of side surfaces meet the upper surface, the upper surface and the lower surface are mirror-symmetrical about a virtual reference plane positioned between the upper surface and the lower surface and perpendicular to the vertical direction, the upper surface has a pair of cutting corners, the plurality of cutting edges include a major cutting edge used for front-turning and extending from each of the pair of cutting corners and a minor cutting edge used for high feed back-turning and extending from each of the pair of cutting corners, a representative inclination of the minor cutting edge is greater than a representative inclination of the major cutting edge with respect to the virtual reference plane, and the major cutting edge has an entering angle larger than 90° with respect to the workpiece, and the minor cutting edge has an entering angle smaller than 30° with respect to the workpiece.

In one embodiment, the representative inclination of the major cutting edge may be the inclination with respect to the virtual reference plane of a first imaginary line extending from each of the pair of cutting corners to a first vertical line passing through a half-length point of the major cutting edge. Based on the first imaginary line, a sum of area of portions defined by the first imaginary line and the major cutting edge above the first imaginary line may be equal to a sum of areas of portions defined by the first imaginary line and the major cutting edge below the first imaginary line. The representative inclination of the minor cutting edge may be the inclination with respect to the virtual reference plane of a second imaginary line extending from each of the pair of cutting corners to a second vertical line passing through a half-length point of the minor cutting edge. Based on the second imaginary line, a sum of area of portions defined by the second imaginary line and the minor cutting edge above the second imaginary line may be equal to a sum of areas of portions defined by the second imaginary line and the minor cutting edge below the second imaginary line.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
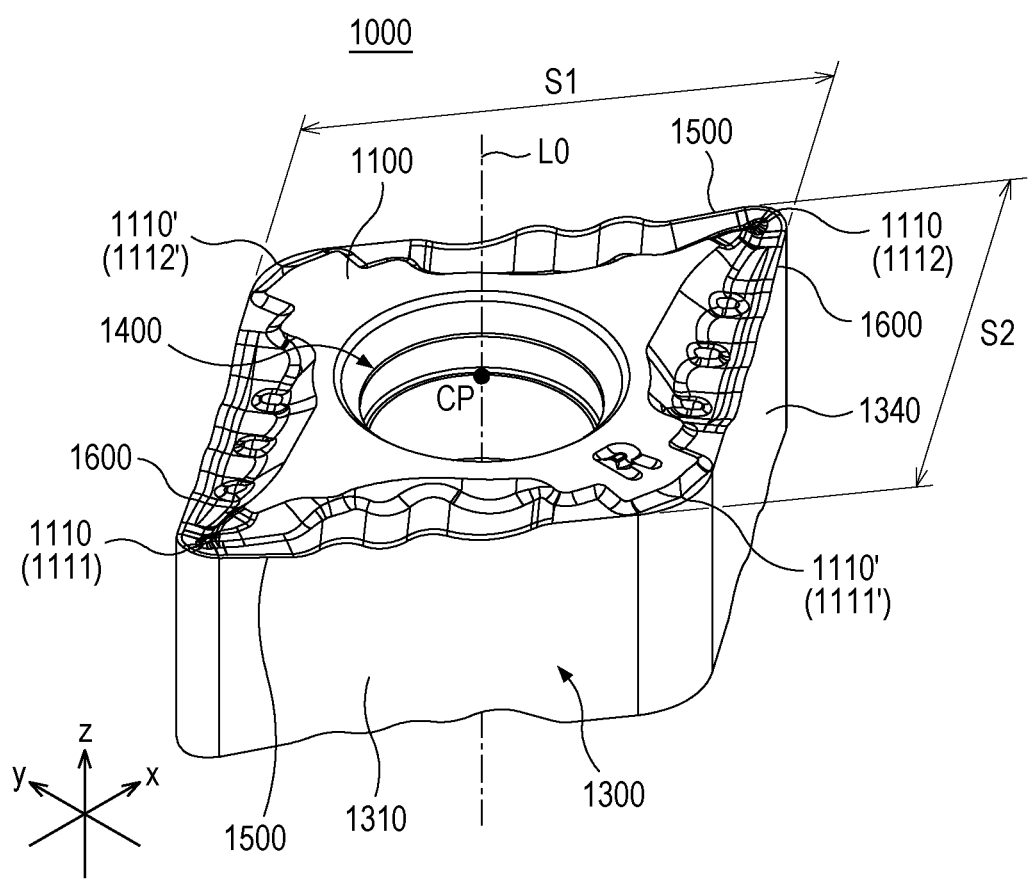
FIG. 1 is a perspective view showing a cutting insert according to one embodiment of the present disclosure.

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms in the present disclosure include meanings or definitions that are commonly understood by those of ordinary skill in the art unless otherwise defined. All terms in the present disclosure are selected for the purpose of describing the present disclosure more clearly, and are not selected to limit the scope of the present disclosure.

As used in the present disclosure, expressions such as "comprising," "including," "having," and the like are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will be also applied to the singular expressions recited in the claims.

The expressions, such as "first," "second," etc., which are shown in various embodiments of the present disclosure, are used to separate a plurality of elements from each other, and are not intended to limit an order or importance of the corresponding elements.

The directional term "upward," "upper," etc., used herein is based on a direction in which an upper face is positioned with respect to a lower face in the accompanying drawings. The directional term "downward," "lower," etc., means a direction opposite to the upward or upper direction. A cutting insert shown in the accompanying drawings may be otherwise oriented and the above-described directional terms may be interpreted accordingly.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

Figure 2:
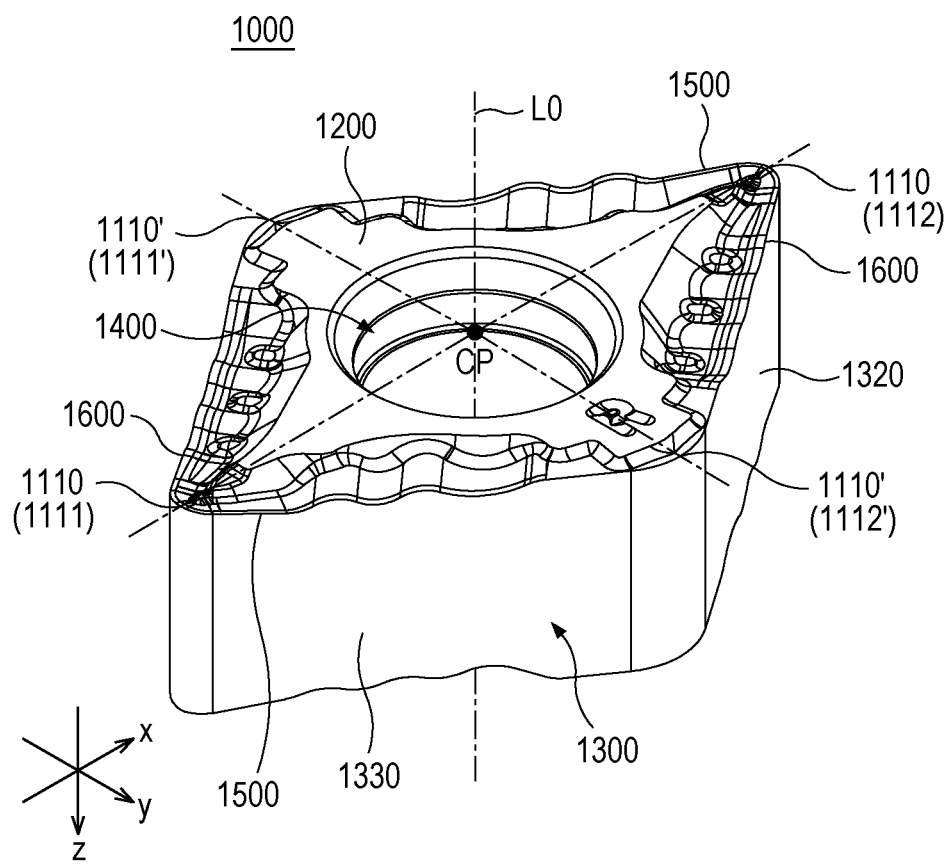
FIG. 2 is a perspective view of the cutting insert according to one embodiment of the present disclosure, which is viewed from another direction.

FIG. 1 is a perspective view showing a cutting insert 1000 according to one embodiment of the present disclosure. FIG. 2 is a perspective view of the cutting insert 1000 according to one embodiment of the present disclosure, which is viewed from another direction.

Referring to FIGS. 1 and 2, the cutting insert 1000 may be referred to as a double-sided indexable cutting insert that can be used for turning. The cutting insert 1000 includes an upper surface 1100 and a lower surface 1200 facing each other in the vertical direction (the z direction in FIGS. 1 and 2), as well as a side portion 1300 connecting the upper surface 1100 and the lower surface 1200. The cutting insert 1000 according to one embodiment has a mounting hole 1400 formed to pass through the upper surface 1100 and the lower surface 1200, and may be securely mounted to a turning tool through the use of a fixing member such as a clamp screw or the like.

The side portion 1300 of the cutting insert 1000 has four side surfaces such as a first side surface 1310, a second side surface 1320, a third side surface 1330 and a fourth side surface 1340. The first side surface 1310 and the second side surface 1320 face each other, while the third side surface 1330 and the fourth side surface 1340 face each other. That is, when the cutting insert 1000 is viewed from the above or below, the upper surface 1100 and the lower surface 1200 have a rectangular shape. In one embodiment, the edge lengths S1 and S2 of the side surfaces are all the same so that the upper surface 1100 and the lower surface 1200 have a rhombus shape.

In the cutting insert 1000, cutting edges may be formed at the edges where the upper surface 1100 and the side surfaces meet and also at the edges where the lower surface 1200 and the side surfaces meet.

Each of the upper surface 1100 and the lower surface 1200 has four corners where the corners of adjacent side surfaces meet. Two of the four corners may be referred to as cutting corners 1110, while the remaining two corners may be referred to as non-cutting corners 1110'.

In one embodiment, a pair of cutting corners 1110 includes a first cutting corner 1111 where the first side surface 1310 and the third side surface 1330 adjacent to each other meet the upper surface 1100 (or the lower surface 1200), as well as a second cutting corner 1112 where the second side surface 1320 and the fourth side surface 1340 adjacent to each other meet the upper surface 1100 (or the lower surface 1200). A pair of non-cutting corners 1110' includes a first non-cutting corner 1111' where the first side surface 1310 and the fourth side surface 1340 adjacent to each other meet the upper surface 1100 (or the lower surface 1200) and a second non-cutting corner 1112' where the second side surface 1320 and the third side surface 1330 adjacent to each other meet the upper surface 1100 (or the lower surface 1200).

A plurality of cutting edges formed on the cutting insert 1000 includes a major cutting edge 1500 and a minor cutting edge 1600 extending from a pair of cutting corners 1110. That is, the major cutting edge 1500 and the minor cutting edge 1600 are provided on each of the upper surface 1100 and the lower surface 1200. The major cutting edge 1500 may be used for front-turning (or forward-turning), while the minor cutting edge 1600 may be used for back-turning (or backward-turning), particularly high feed back-turning. As a high feed condition capable of significantly improving the productivity may be a condition of 0.5 mm/rev or more.

To enable the use of both surfaces of the cutting insert 1000, the upper surface 1100 and the lower surface 1200 are mirror-symmetrical with respect to a virtual plane (hereinafter referred to as virtual reference plane) perpendicular to the central axis L0 passing through the center CP of a mounting hole 1400 and extending in the vertical direction. Accordingly, in the following description, the upper surface 1100 will be mainly described among the upper surface 1100 and the lower surface 1200 to avoid duplicate descriptions.

The cutting insert 1000 according to an exemplary embodiment has an upper surface 1100 having a rhombus shape, but the shape of the cutting insert 1000 is not limited thereto. For example, the cutting insert 1000 may have an upper surface of a circular shape, an oval shape and various polygonal shapes. One or more cutting corners may be provided on the upper surface of various shapes. When the upper surface has a rhombus shape, the upper surface may have cutting corners having various corner angles. Even for the cutting inserts having various shapes of upper surfaces, the major cutting edge and the minor cutting edge extending from the cutting corner are formed so that the cutting insert can be applied to both front-turning and high feed back-turning.

Figure 3:
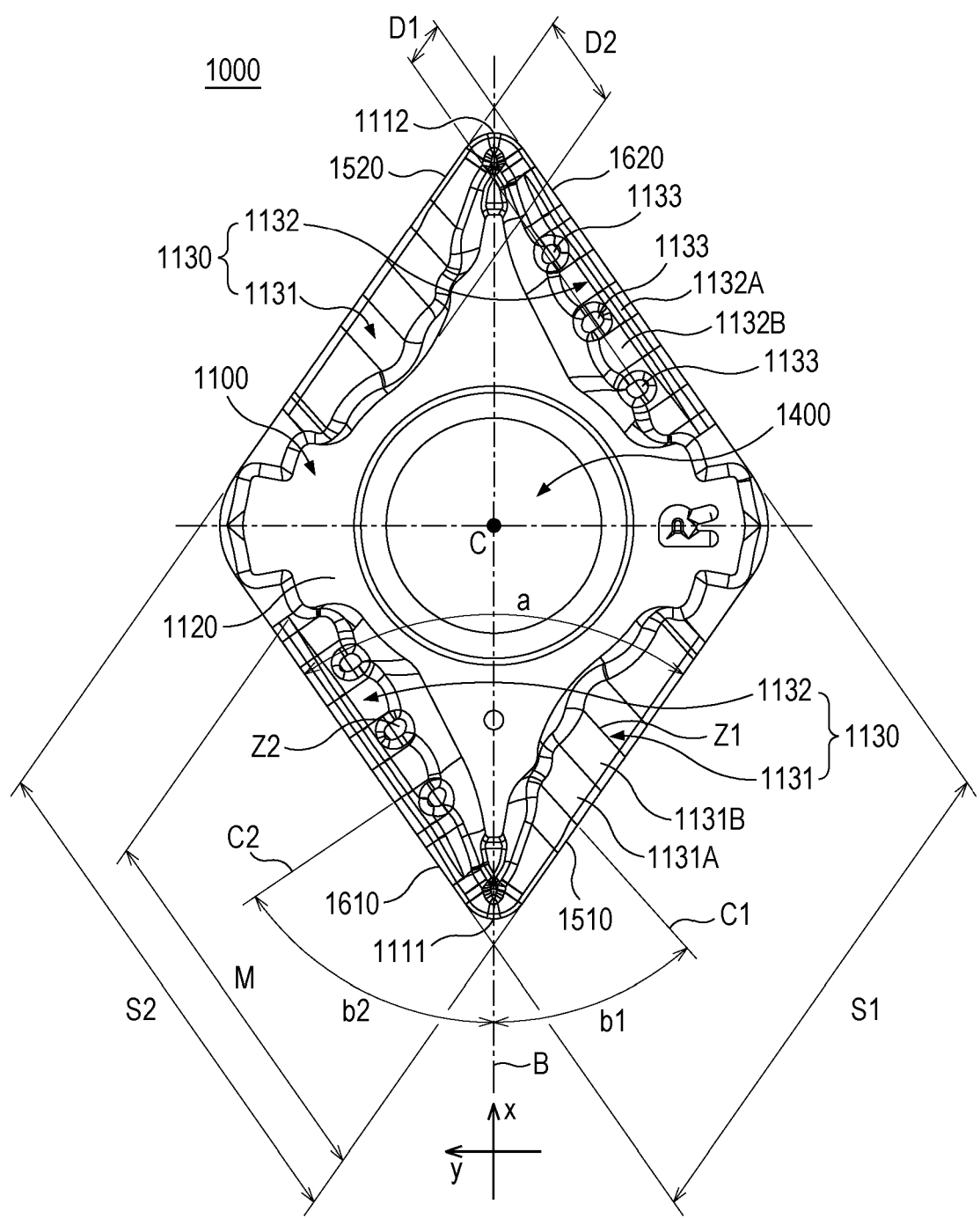
FIG. 3 is a plan view of the cutting insert shown in FIG. 1.

FIG. 3 is a plan view of the cutting insert 1000 shown in FIG. 1.

Referring to FIG. 3, the major cutting edge 1500 includes a first cutting edge 1510 extending from the first cutting corner 1111 and formed at the corner where the first side surface 1310 and the upper surface 1100 meet, as well as a second cutting edge 1520 extending from the second cutting corner 1112 and formed at the corner where the second side surface 1320 and the upper surface 1100 meet. In addition, the minor cutting edge 1600 includes a third cutting edge 1610 extending from the first cutting corner 1111 and formed at the corner where the third side surface 1330 and the upper surface 1100 meet, as well as a fourth cutting edge 1620 extending from the second cutting corner 1112 and formed at the corner where the fourth side surface 1340 and the upper surface 1100 meet. That is, one major cutting edge 1500 and one minor cutting edge 1600 are formed per cutting corner.

The cutting corner 1110 may have an acute corner angle (a) to improve machining precision without generating high radial pressure that may cause vibration during turning of a workpiece.

The corner angle (a) of the cutting corner 1110 may be 66° or more and 75° or less. The corner angle (a) in the cutting insert 1000 according to one embodiment is 70°. If the corner angle of the cutting corner is less than 66°, then the cutting corner is narrowed and structurally weak. Accordingly, a cutting insert having such a corner angle is not suitable for use in high feed back-turning under a large load. In addition, since the upper surface is narrowed, it is difficult to expect good chip discharge since an inclined surface area for providing a chip forming function and a space for discharging chips are limited. If the corner angle of the cutting corner exceeds 75°, then the entering angle (or cutting edge angle) of the cutting insert with respect to the workpiece during back-turning becomes small, whereby the thickness of chips generated from the workpiece becomes thinner. A thin chip may easily droop, thereby making it difficult to discharge the chip smoothly, which may result in a decrease in machining quality by leaving a scratch on the machined surface of a workpiece.

The upper surface 1100 includes a seat surface 1120 and a rake surface 1130 provided between the mounting hole 1400 and the cutting edges 1500 and 1600. The seat surface 1120 is a mounting surface for mounting the cutting insert on a tool, and is formed as a planar surface parallel to a virtual reference plane F (see FIGS. 4 and 5). The rake surface 1130 is a surface on which chips generated in a turning process slide (a surface for inducing the discharge of chips), and is formed as a curved surface in which a plurality of valley surfaces and a plurality of ridge surfaces are alternately connected.

The rake surface 1130 includes a front-turning rake surface 1131 formed adjacent to the major cutting edge 1500 so as to smoothly induce the discharge of chips generated during front-turning, as well as a back-turning rake surface 1132 formed adjacent to the minor cutting edge 1600 so as to smoothly induce the discharge of chips generated during back-turning.

The front-turning rake surface 1131 is formed such that a plurality of valley surfaces 1131A and a plurality of ridge surfaces 1131B are alternately continuous along the extension direction of the major cutting edge 1500 (the first and second major cutting edges 1510 and 1520). Further, the back-turning rake surface 1132 is formed such that a plurality of valley surfaces 1132A and a plurality of ridge surfaces 1132B are alternately continuous along the extension direction of the minor cutting edge 1600 (the first and second minor cutting edges 1610 and 1620). In one embodiment, the front-turning rake surface 1131 has a twisted shape so that, during front-turning, the chips generated from the workpiece can be induced to be discharged in a direction away from the workpiece. That is, when an imaginary line passing through the pair of cutting corners 1110, i.e., the first cutting corner 1111 and the second cutting corner 1112, is defined as a corner bisector B, the angle b1 between the extension line C1 of the intersection of the valley surface 1131A and the ridge surface 1131B of the front-turning rake surface 1131 and the corner bisector B is smaller than the angle b2 between the extension line C2 of the intersection of the valley surface 1132A and the ridge surface 1132B of the back-turning rake surface 1132 and the corner bisector B. By forming the angle b2 on the back-turning rake surface 1132 larger than the angle b1 on the front-turning rake surface 1131 in this way, especially during back-turning, chip discharge in the chip drooping direction can be induced to the opposite direction.

A plurality of dot portions 1133 spaced apart from each other along the extension direction of the minor cutting edge 1600 is formed on the back-turning rake surface 1132 so that the chips are generated as curled soft chips and induced to be discharged more smoothly during back-turning. The dot portions 1133 may be formed to stand out from the back-turning rake surface 1132, especially from the valley surface 1132A of the back-turning rake surface 1132, and may be formed to include surfaces parallel to the seat surface 1120. The dot portions 1133 may serve as a chip breaker for good chip control. In one embodiment, three dot portions 1133 are formed on the back-turning rake surface 1132. However, the number of the dot portions 1133 is not limited thereto. An imaginary line connecting the dot portions 1133 may be inclined with respect to the minor cutting edge 1600 so that the chips can be guided in a direction in which the chips are smoothly discharged. That is, the dot portions 1133 may be formed so that, based on the cutting corner 1110 (the first cutting corner 1111 and the second cutting corner 1112), the distance between the dot portions 1133 and the adjacent minor cutting edge 1600 increases as the dot portions 1133 go away from the cutting corner 1110.

When the cutting insert 1000 is viewed from the above, the distance D1 between the minor cutting edge 1600 and the dot portions 1133 is smaller than the distance D2 between the major cutting edge 1500 and the seat surface intersection of the front-turning rake surface 1131. In this regard, the distance D1 may be the maximum distance of the dot portions 1133 from the minor cutting edge 1600, while the distance D2 may be the maximum distance of the seat surface intersection of the front-turning rake surface 1131 from the major cutting edge 1500.

In the cutting insert 1000 according to one embodiment, the rake surface 1130 is formed in a wavy curved surface shape, and the distance D1 on the back-turning rake surface 1132 is set to be shorter than the distance D2 on the front-turning rake surface 1131 so that the chips can be further prevented from drooping. By doing so, it is possible to ensure that smooth chips having a curled shape are generated and good chip discharge is induced.

Figure 4:
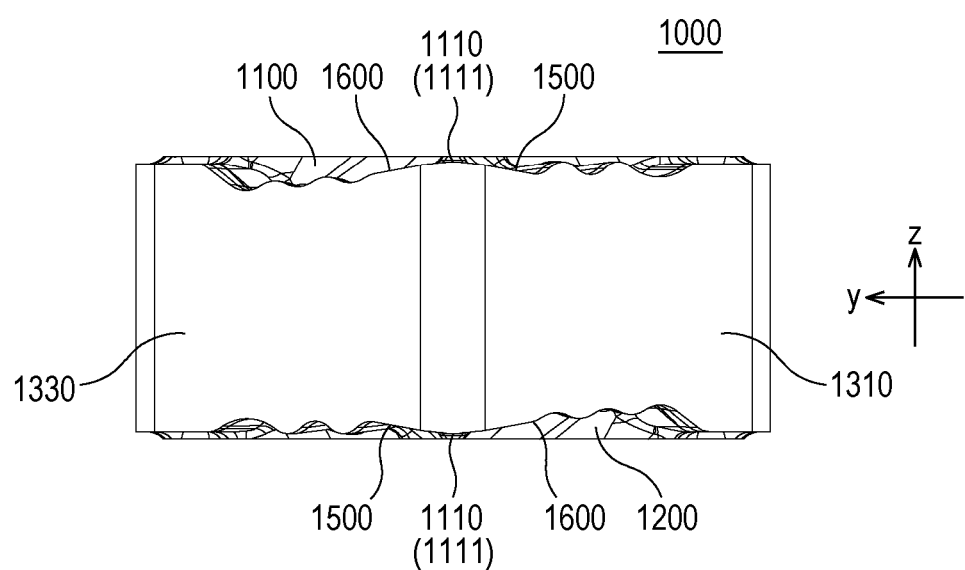
FIG. 4 is a front view of the cutting insert shown in FIG. 1.
Figure 5:
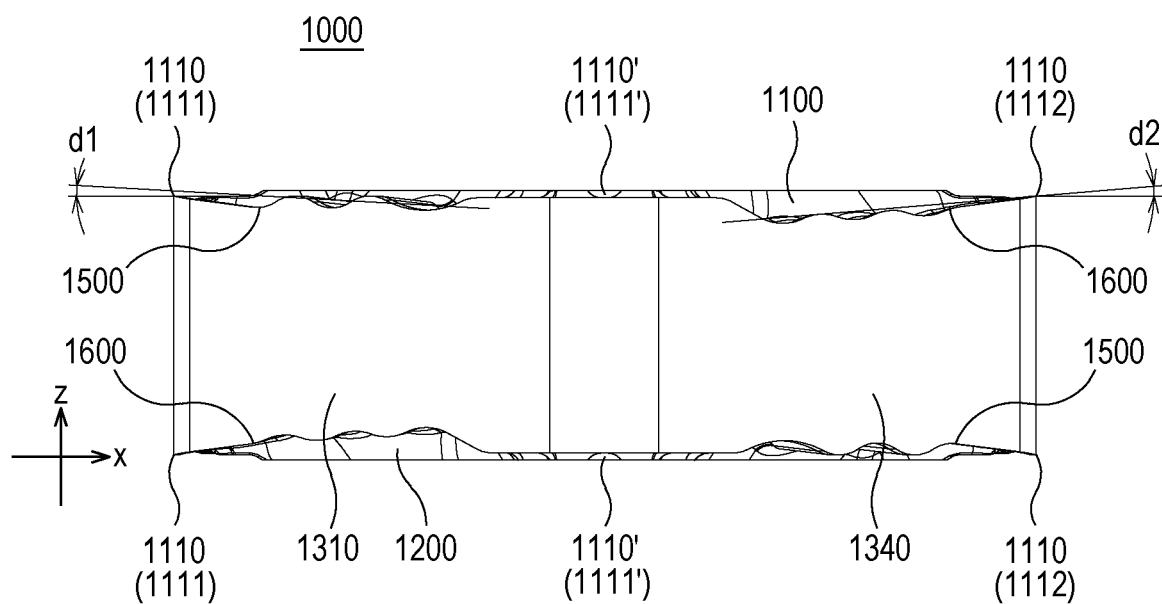
FIG. 5 is a right side view of the cutting insert shown in FIG. 1.
Figure 6:
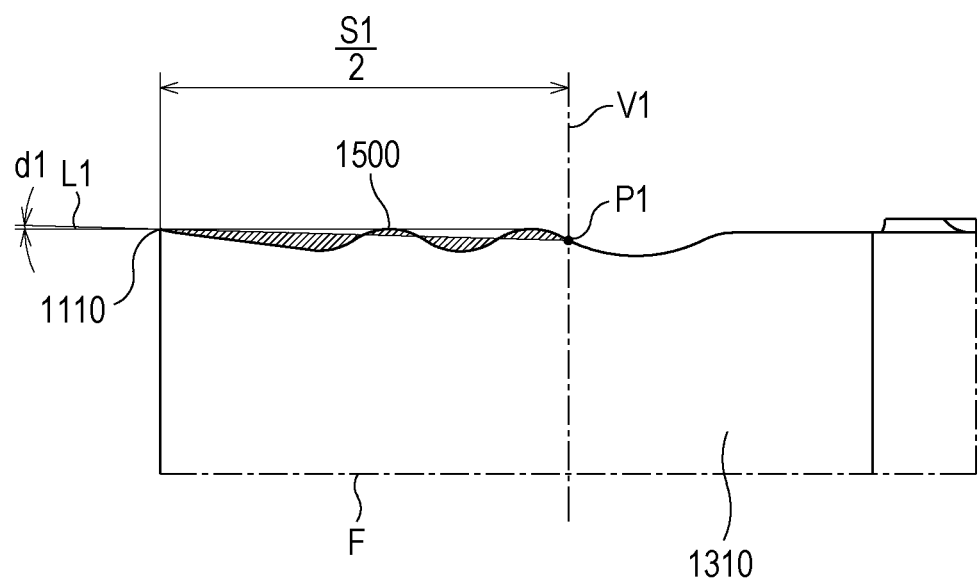
FIG. 6 is an enlarged view of the major cutting edge shown in FIG. 5.
Figure 7:
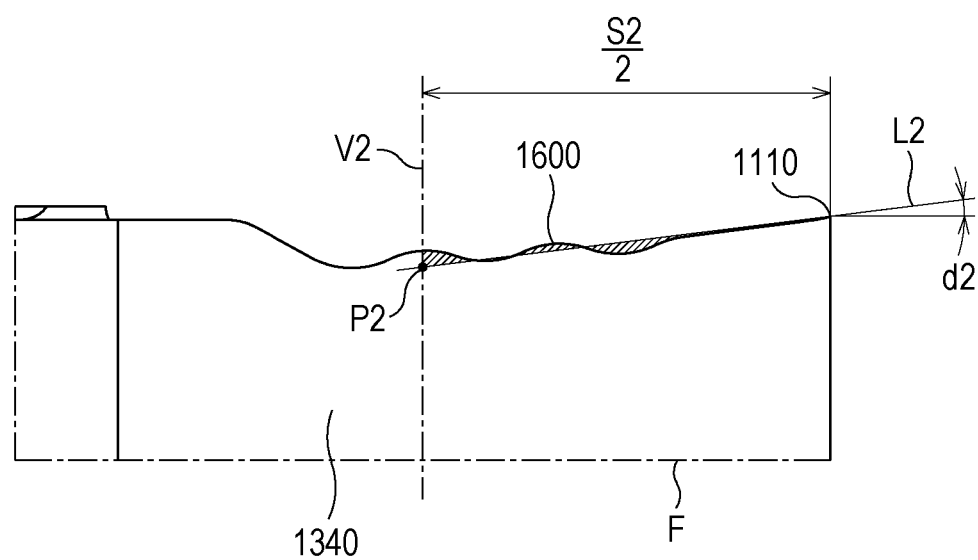
FIG. 7 is an enlarged view of the minor cutting edge shown in FIG. 5.
Figure 8A:
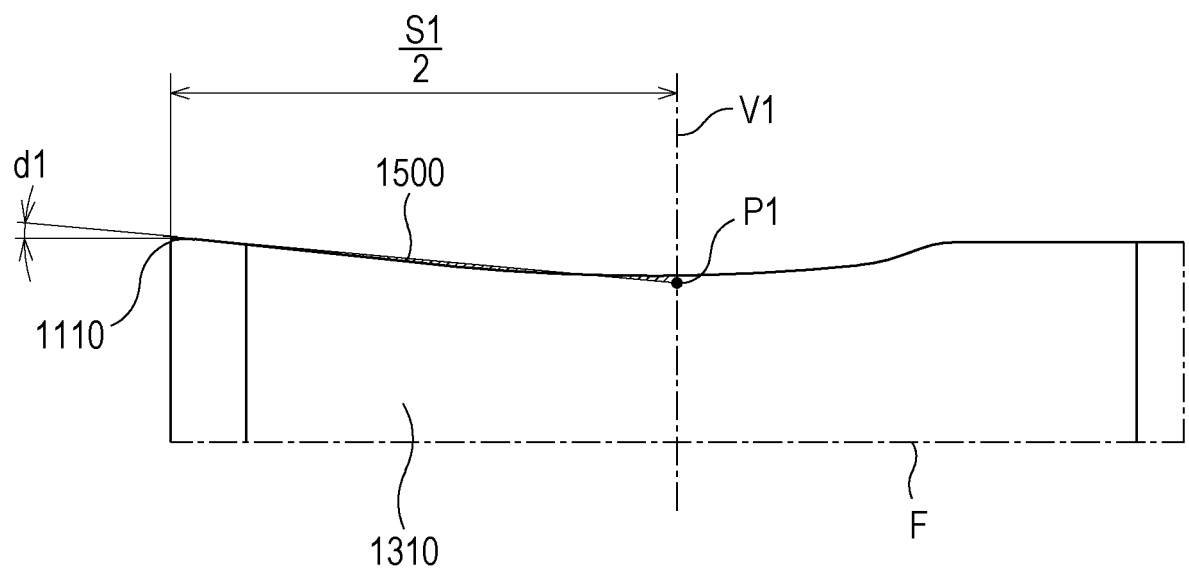
FIG. 8A and FIG. 8B are views showing representative inclinations of cutting edges having a shape in which a straight and a curve are combined.
Figure 8B:
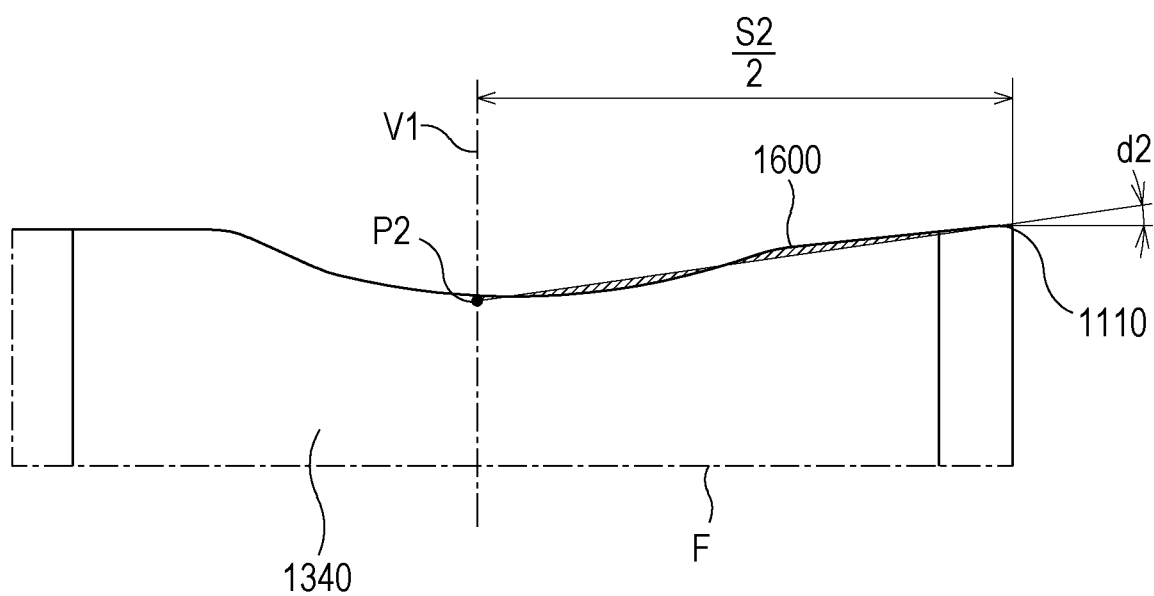
Figure 9A:
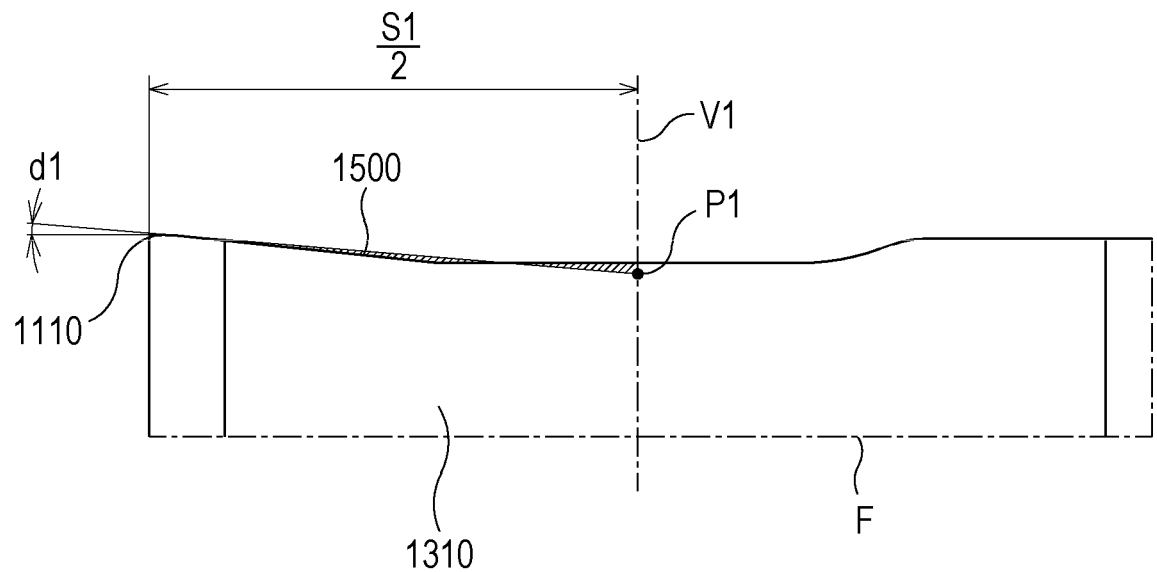
FIG. 9A and FIG. 9B are views showing representative inclinations of cutting edges having a shape in which a plurality of straights are combined.
Figure 9B:
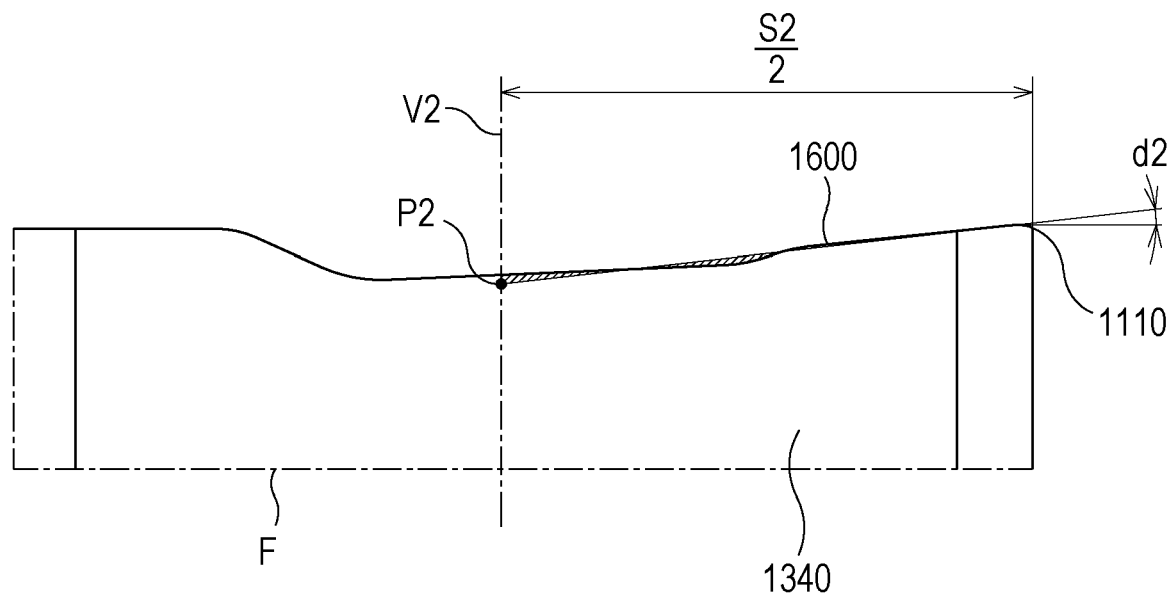
Figure 10A:
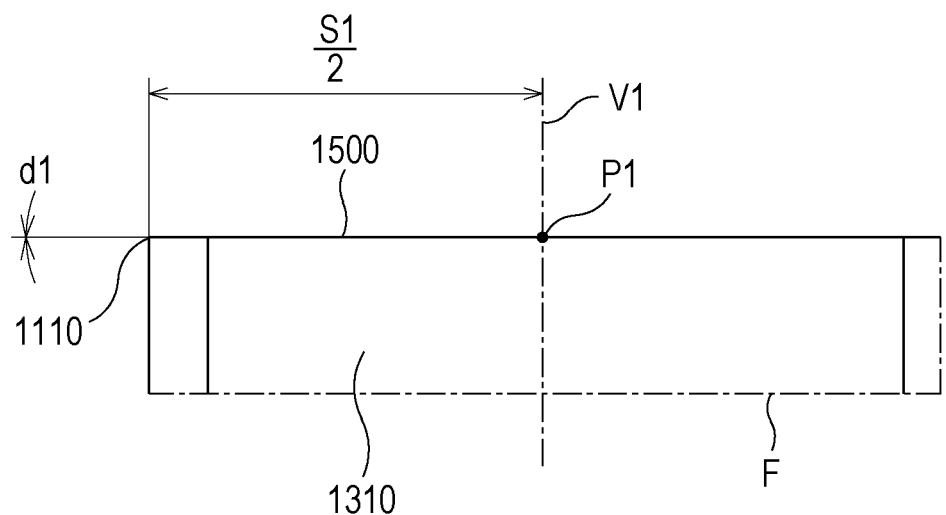
FIG. 10A and FIG. 10B are views showing representative inclinations of cutting edges having a straight shape.
Figure 10B:
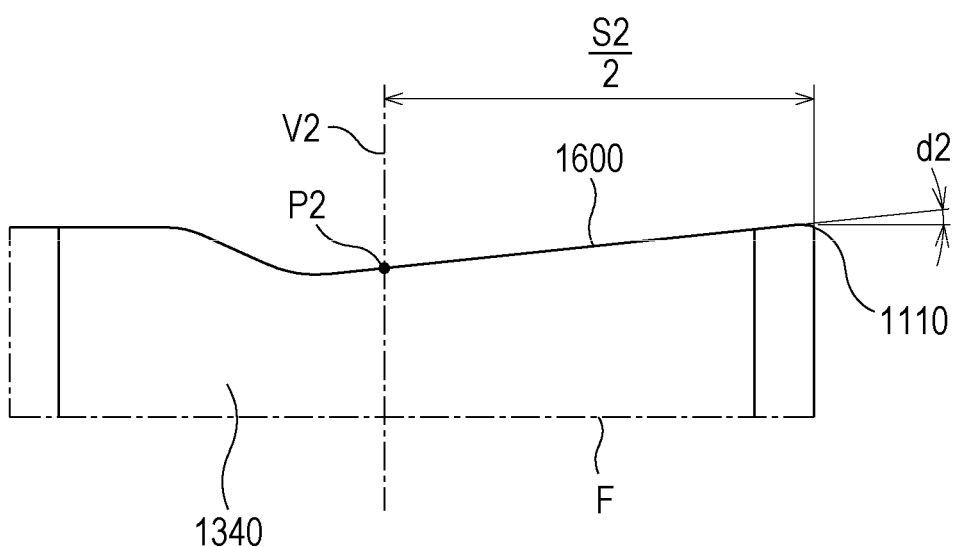
Figure 11A:
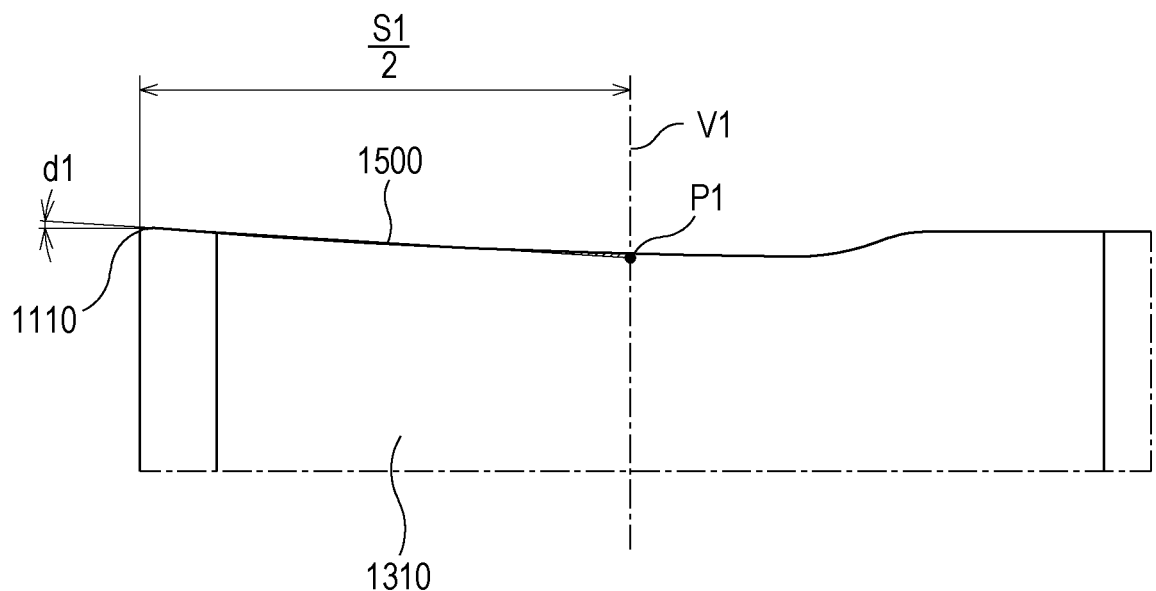
FIG. 11A and FIG. 11B are views showing representative inclinations of cutting edges having a curved shape.
Figure 11B:
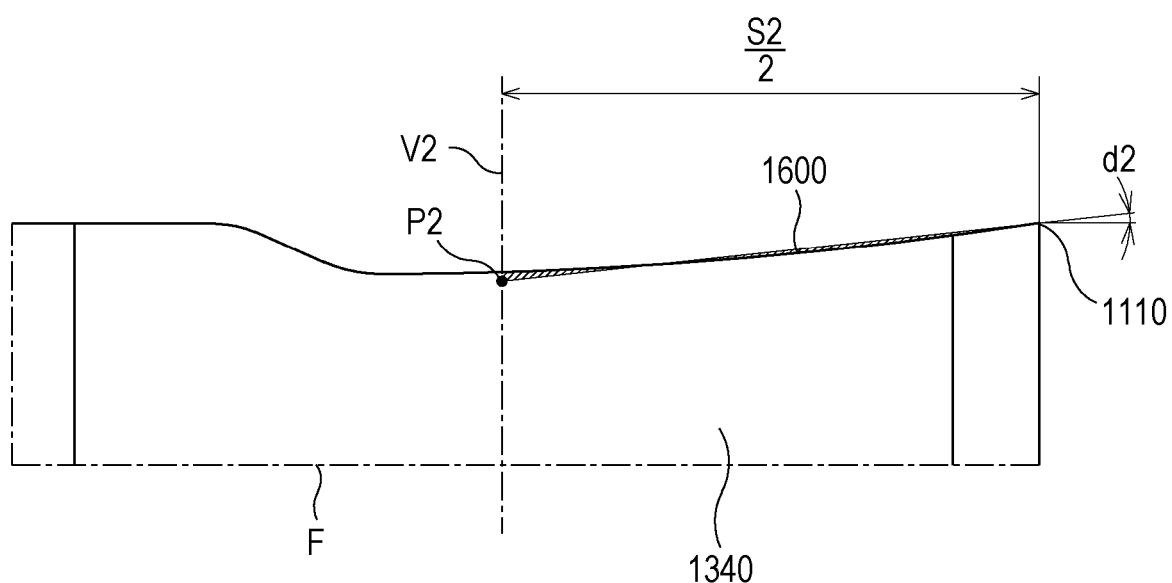

FIG. 4 is a front view of the cutting insert 1000 shown in FIG. 1. FIG. 5 is a right side view of the cutting insert 1000 shown in FIG. 1. FIG. 6 is an enlarged view of the major cutting edge 1500 shown in FIG. 5. FIG. 7 is an enlarged view of the minor cutting edge 1600 shown in FIG. 5. FIG. 8A and FIG. 8B are views showing representative inclinations of cutting edges having a shape in which a straight and a curve are combined, while FIG. 9A and FIG. 9B are views showing representative inclinations of cutting edges having a shape in which a plurality of straights are combined. Furthermore, FIG. 10A and FIG. 10B are views showing representative inclinations of cutting edges having a straight shape, while FIG. 11A and FIG. 11B are views showing representative inclinations of cutting edges having a curved shape.

Referring to FIGS. 4 to 7, the cutting insert 1000 according to one embodiment includes the cutting edge (the major cutting edge 1500 and the minor cutting edge 1600) having a shape in which a straight and a serration are combined. The straight section may extend from the cutting corner 1110, and the serration section (or, wavy section) may extend continuously from the straight section. The cutting edge shape of the cutting insert 1000 is not limited to one embodiment, and the cutting edge of the cutting insert 1000 may be formed in various shapes. For example, as shown in FIGS. 8A to 11B, in another embodiment, the cutting edges (the major cutting edge 1500 and the minor cutting edge 1600) of the cutting insert may be formed to have any one of a straight and a curve are combined (see FIGS. 8A and 8B), a shape in which a plurality of straights are combined (see FIGS. 9A and 9B), a straight shape (see FIGS. 10A and 10B) and a curved shape (see FIGS. 11A and 11B).

In the cutting insert 1000 that can be used for both front-turning and high feed back-turning, the minor cutting edge 1600 used for high feed back-turning is formed to be inclined with respect to the virtual reference plane F more than the major cutting edge 1500 used for front-turning. That is, the first inclination angle d1 of the major cutting edge 1500 is smaller than the second inclination angle d2 of the minor cutting edge 1600.

In this regard, the first inclination angle of the major cutting edge 1500 means a representative inclination d1 of the major cutting edge 1500. The representative inclination d1 is the inclination with respect to the virtual reference plane F of a first imaginary line L1 extending from the cutting corner 1110 to a first vertical line V1 passing through a half-length point P1 of the major cutting edge 1500. Moreover, the second inclination angle of the minor cutting edge 1600 means a representative inclination d2 of the minor cutting edge 1600. The representative inclination d2 is the inclination with respect to the virtual reference plane F of a second imaginary line L2 extending from the cutting corner 1110 to a second vertical line V2 passing through a half-length point P2 of the minor cutting edge 1600 (see FIGS. 6 to 11B).

In one embodiment, the first imaginary line L1 may be specified as follows. That is, the sum of the areas of the portions defined by the first imaginary line L1 and the major cutting edge 1500 above the first imaginary line L1 based on the first imaginary line L1 (the shaded portions above the first imaginary line L1) may be equal to the sum of the areas of the portions defined by the first imaginary line L1 and the major cutting edge 1500 below the first imaginary line L1 (the shaded portions below the first imaginary line L1).

In one embodiment, the second imaginary line L2 may be specified as follows. That is, the sum of the areas of the portions defined by the second imaginary line L2 and the minor cutting edge 1600 above the second imaginary line L2 based on the second imaginary line L2 (the shaded portions above the second imaginary line L2) may be equal to the sum of the areas of the portions defined by the second imaginary line L2 and the minor cutting edge 1600 below the second imaginary line L2 (the shaded portions below the second imaginary line L2).

Figure 12:
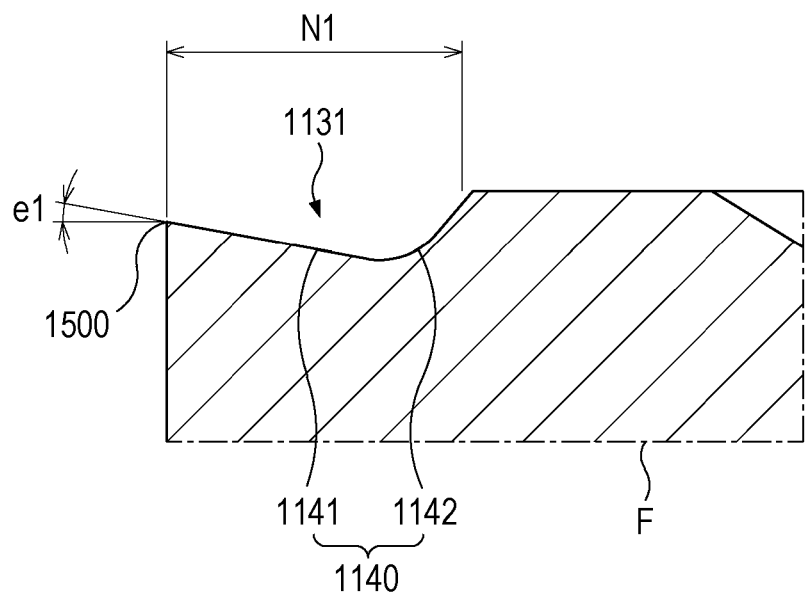
FIG. 12 is a partial sectional view of the cutting insert at point Z1 shown in FIG. 3.
Figure 13:
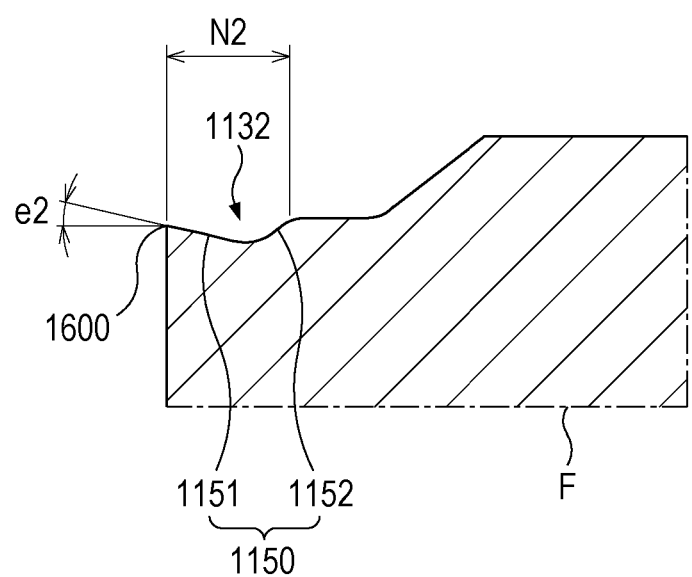
FIG. 13 is a partial sectional view of the cutting insert at point Z2 shown in FIG. 3.

FIG. 12 is a partial sectional view of the cutting insert 1000 at point Z1 shown in FIG. 3. FIG. 13 is a partial sectional view of the cutting insert 1000 at point Z2 shown in FIG. 3.

As shown in FIG. 12, a front-turning chip former 1140 is formed on the front-turning rake surface 1131. The front-turning chip former 1140 includes a first groove surface 1141 inclined downward toward the mounting hole 1400 and a second groove surface 1142 connected to the first groove surface 1141 and inclined upward toward the mounting hole 1400.

Furthermore, as shown in FIG. 13, a back-turning chip former 1150 is formed on the back-turning rake surface 1132. The back-turning chip former 1150 includes a third groove surface 1151 inclined downward toward the mounting hole 1400 and a fourth groove surface 1152 connected to the third groove surface 1151 and inclined upward toward the mounting hole 1400.

As described above, the cutting insert 1000 according to one embodiment has a sufficiently large corner angle (a), whereby the front-turning chip former 1140 and the back-turning chip former 1150 can be easily formed on the rake surface 1130 of the upper surface 1100 without being greatly restricted in space. In one embodiment, the back-turning chip former 1150 is formed to have a length (M) of at least ½ of the length of any one edge of the upper surface 1100 (e.g., the length (S2) of the edge of the third side surface meeting the upper surface) so as to induce stable chip discharge (see FIG. 3).

Referring to FIGS. 12 and 13, the inclination angle e2 of the back-turning chip former 1150 with respect to the virtual reference plane F is larger than the inclination angle e1 of the front-turning chip former 1140 symmetrical to the corner bisector B, and the ramp distance N2 of the back-turning chip former 1150 is set to be smaller than the ramp distance N1 of the front-turning chip former 1140 symmetrical to the corner bisector B. This makes it possible to induce chip breaking, thereby preventing chips from drooping.

Figure 14:
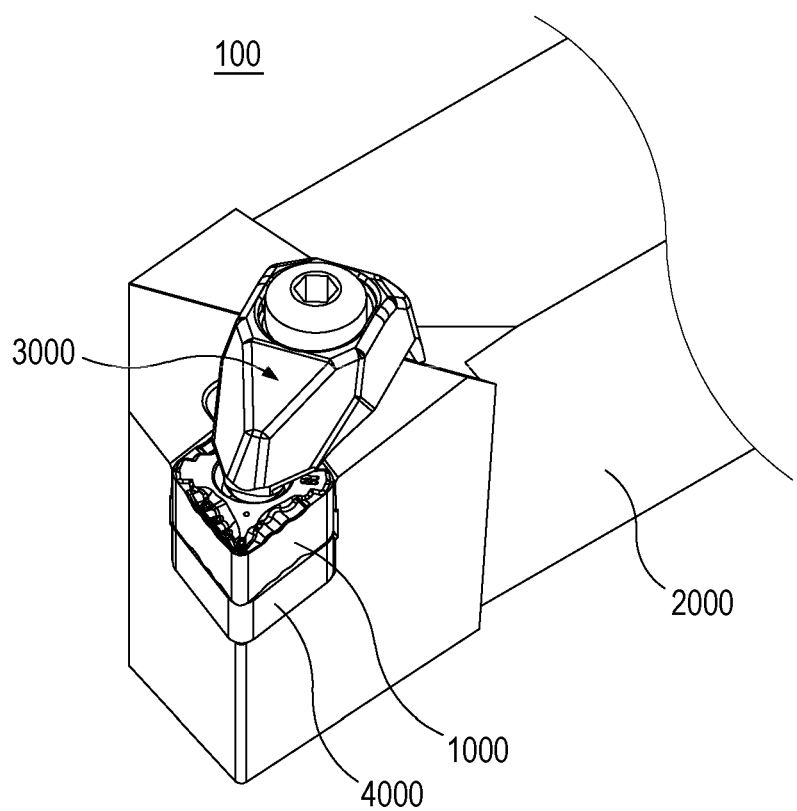
FIG. 14 is a perspective view showing a cutting tool assembly according to one embodiment of the present disclosure.
Figure 15:
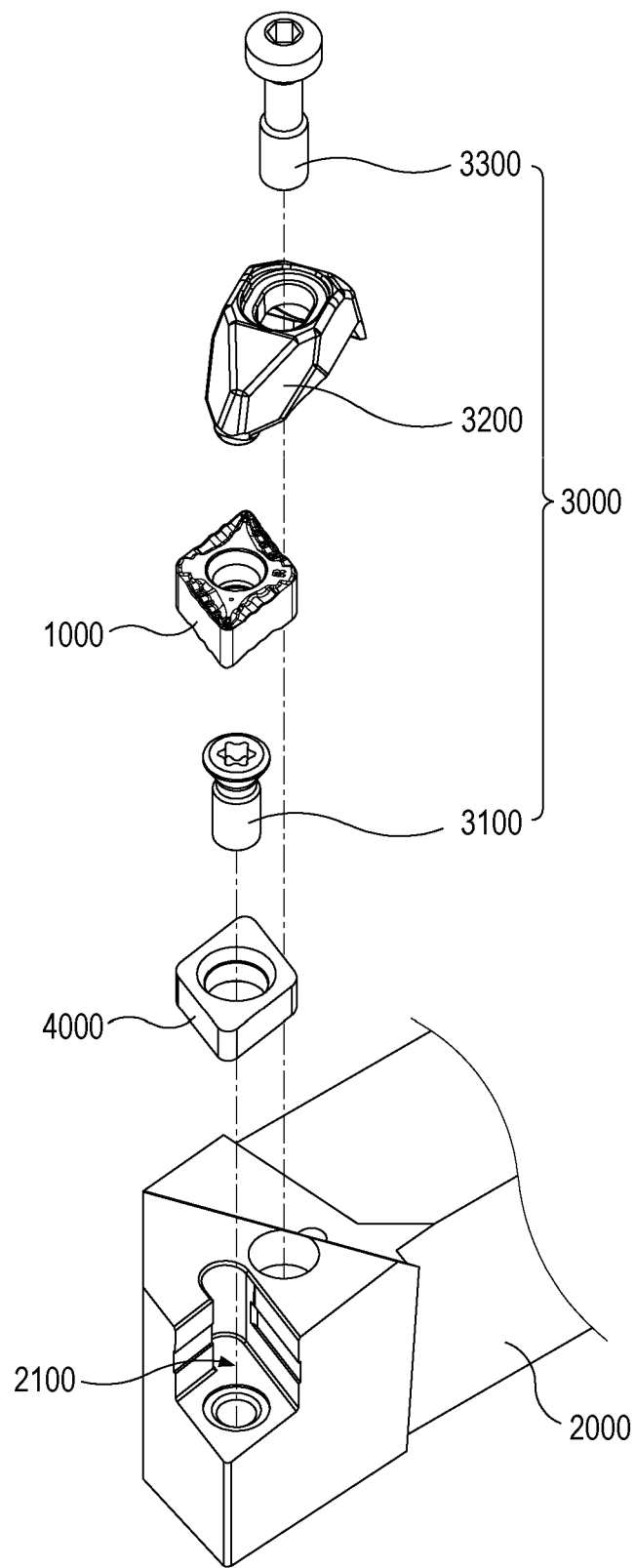
FIG. 15 is an exploded perspective view of the cutting tool assembly shown in FIG. 14.

FIG. 14 is a perspective view showing a cutting tool assembly 100 according to one embodiment of the present disclosure. FIG. 15 is an exploded perspective view of the cutting tool assembly 100 shown in FIG. 14.

Referring to FIGS. 14 and 15, the cutting tool assembly 100 may be installed on a lathe and configured to cut a rotating workpiece. To this end, the cutting tool assembly 100 includes the aforementioned cutting insert 1000, a tool holder 2000 provided at a tip thereof with an insert pocket 2100 in which the cutting insert 1000 is mounted, and a fixing member 3000 configured to fix the cutting insert 1000 to the insert pocket 2100 of the tool holder 2000.

The cutting tool assembly 100 according to one embodiment includes a shim 4000 configured to support the cutting insert 1000 so that the cutting insert 1000 can be stably mounted to the tool holder 2000. The cutting insert 1000 may be seated in the insert pocket 2100 of the tool holder 2000 in a state in which the cutting insert 1000 is supported by the shim 4000. In another embodiment, the cutting insert 1000 may be directly seated in the insert pocket 2100 of the tool holder 2000 without being supported by the shim 4000. In this case, the insert pocket 2100 may include a surface having a shape complementary to the shape of the lower surface of the cutting insert 1000.

The fixing member 3000 includes an insert screw 3100 fitted to the cutting insert 1000 and the shim 4000 arranged up and down, a clamp 3200 configured to fix the cutting insert 1000, and a clamp screw 3300 inserted into the clamp 3200 and fastened to the tool holder 2000. The cutting insert 1000 may be fixed to the tool holder 2000 by tightening the clamp screw 3300 so that the clamp 3200 can press the cutting insert 1000.

Figure 16:
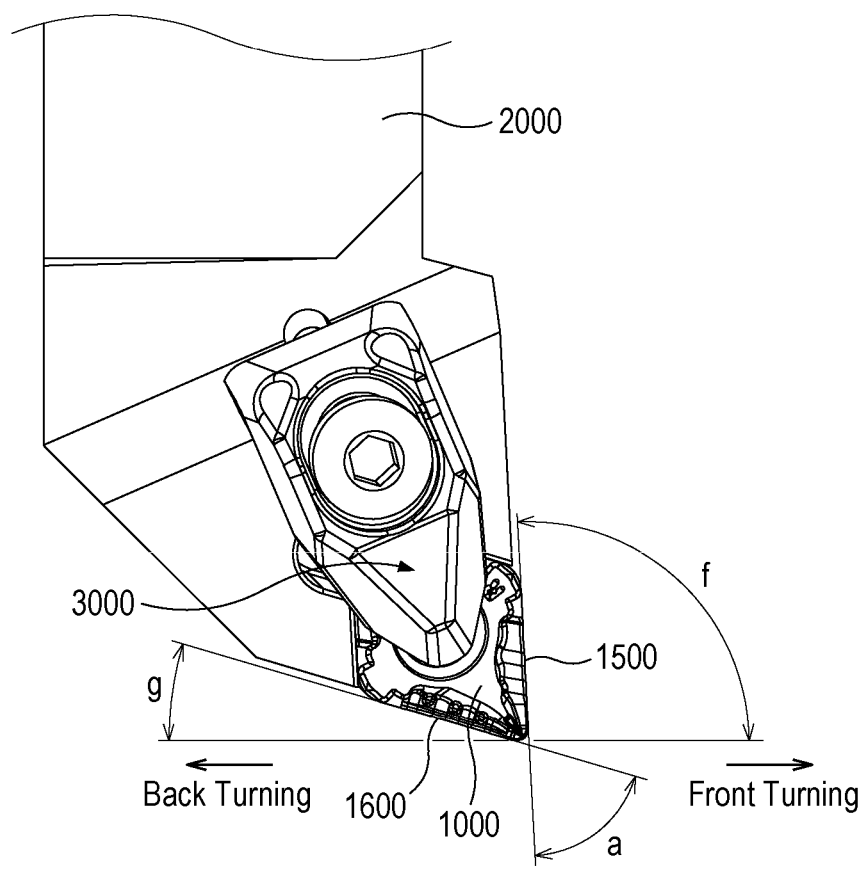
FIG. 16 is a view showing a state in which the cutting tool assembly shown in FIG. 14 cuts a workpiece.
Figure 17:
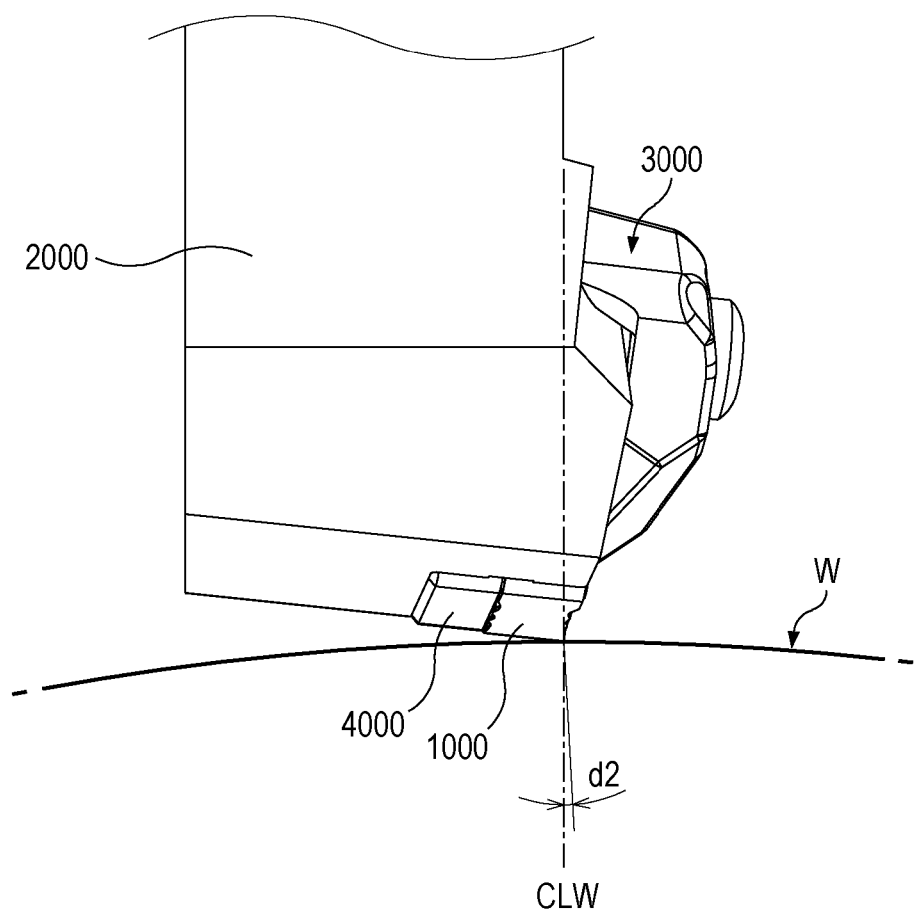
FIG. 17 is a view showing a state in which the cutting tool assembly shown in FIG. 14 cuts a workpiece, which is viewed from another direction.

FIGS. 16 and 17 are views showing a state in which the cutting tool assembly 100 shown in FIG. 14 cuts a workpiece W.

Referring to FIGS. 16 and 17, the major cutting edge 1500 of the cutting insert 1000 has an entering angle f larger than 90° with respect to the workpiece W, and the minor cutting edge 1600 has an entering angle g smaller than 30° with respect to the workpiece W. Since the entering angle g at the time of back-turning is smaller than the entering angle f at the time of front-turning, it is important to secure a chip discharge space through the effective arrangement of the cutting edges and the chip formers. The cutting insert 1000 employed in the cutting tool assembly 100 according to one embodiment induces smooth chip generation and good chip discharge through the effective arrangement of the cutting edges and the chip formers. The cutting insert 1000 performs machining in the back-turning direction in which the entering angle is small. This makes it possible to induce smooth chip discharge.

The cutting tool assembly 100 may have an optimized edge structure. That is, in the cutting insert 1000, the representative inclination d2 of the minor cutting edge 1600 is a positive inclination larger than the representative inclination d1 of the major cutting edge 1500. Accordingly, the cutting insert 1000 mounted on the cutting tool assembly 100 may have a structure similar to that of the positive insert with respect to the center line CLW of the workpiece W. As such, through the structure similar to the positive edge arrangement, it is possible to prevent chips from drooping onto the outer surface of the finished workpiece and to induce smooth chip discharge.

According to the above-described embodiment, the cutting insert 1000 has a chip control function that enables back-turning at a smaller lead angle (g). As such, the cutting insert 1000 can have a larger corner angle (a) at the cutting corner than the conventional cutting insert, thereby solving the problem that may occur when the cutting corner is formed narrow to secure an entering angle during back-turning.

According to the above-described embodiment, it is possible to induce chips not to droop through the back-turning angle control attributable to the structural features of the cutting insert 1000.

The cutting insert 1000 according to the above embodiment, which is a double-sided insert having four corners, can perform stable cutting in both back-turning and front-turning directions. In particular, the cutting insert 1000 can perform high feed machining in the back-turning direction, which makes it possible to improve the productivity. In addition, it is possible to induce smooth chip discharge, thereby preventing damage to the surface of the workpiece due to drooping of chips.

Although the technical features according to the above-described embodiment have been described by taking the right cutting insert as an example, the present disclosure is also applicable to the left cutting insert in which the cutting edge is arranged oppositely.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A cutting insert capable of performing front-turning and high feed back-turning, comprising:
    an upper surface;
        a lower surface opposite to the upper surface in a vertical direction;
        a side portion configured to connect the upper surface and the lower surface;
        a mounting hole extending through the upper surface and the lower surface; and
        a plurality of cutting edges formed at edges where the upper surface meets the side portion,
    wherein the upper surface has one or more cutting corners,
        the plurality of cutting edges including a major cutting edge and a minor cutting edge extending from the cutting corner, and
    wherein a representative inclination of the minor cutting edge used for high feed back-turning is greater than a representative inclination of the major cutting edge used for front-turning with respect to a virtual reference plane perpendicular to the vertical direction.

2. The cutting insert of claim 1, wherein the side portion includes a first side surface, a second side surface, a third side surface and a fourth side surface, the first side surface and the second side surface being opposite to each other, and the third side surface and the fourth side surface being opposite to each other,
    a pair of cutting corners provided on the upper surface,
        the pair of cutting corners including a first cutting corner wherein the first side surface and the third side surface adjacent to each other meet the upper surface and a second cutting corner, and wherein the second side surface and the fourth side surface adjacent to each other meet the upper surface,
        the major cutting edge including a first cutting edge extending from the first cutting corner and formed at an edge where the first side surface and the upper surface meet, and a second cutting edge extending from the second cutting corner and formed at an edge where the second side surface and the upper surface meet, and
        the minor cutting edge including a third cutting edge extending from the first cutting corner and formed at an edge where the third side surface and the upper surface meet, and a fourth cutting edge extending from the second cutting corner and formed at an edge where the fourth side surface and the upper surface meet.

3. The cutting insert of claim 2, wherein the upper surface has a rhombus shape, and wherein each of the pair of cutting corners has a corner angle of 66° or more and 75° or less.

4. The cutting insert of claim 2, wherein each of the plurality of cutting edges has any one of a shape in which a straight and a serration are combined, a shape in which a straight and a curve are combined, a shape in which a plurality of straights are combined, a straight shape and a curved shape.

5. The cutting insert of claim 4, wherein each of the plurality of cutting edges has a shape in which a straight and a serration are combined.

6. The cutting insert of claim 2, wherein the representative inclination of the major cutting edge is an inclination with respect to the virtual reference plane of a first imaginary line extending from each of the pair of cutting corners to a first vertical line passing through a half-length point of the major cutting edge,
   a sum of area of portions defined by the first imaginary line and the major cutting edge above the first imaginary line based on the first imaginary line is equal to a sum of areas of portions defined by the first imaginary line and the major cutting edge below the first imaginary line,
   wherein the representative inclination of the minor cutting edge is an inclination with respect to the virtual reference plane of a second imaginary line extending from the each of the pair of cutting corners to a second vertical line passing through a half-length point of the minor cutting edge,
   a sum of area of portions defined by the second imaginary line and the minor cutting edge above the second imaginary line based on the second imaginary line is equal to a sum of areas of portions defined by the second imaginary line and the minor cutting edge below the second imaginary line.

7. The cutting insert of claim 2, wherein the upper surface includes a seat surface and a rake surface,
   the seat surface is formed as a planar surface parallel to the virtual reference plane, and
   the rake surface is formed as a curved surface in which a plurality of valley surfaces and a plurality of ridge surfaces are alternately connected.

8. The cutting insert of claim 7, wherein the rake surface includes a front-turning rake surface adjacent to the major cutting edge and a back-turning rake surface adjacent to the minor cutting edge.

9. The cutting insert of claim 8, wherein an angle between a corner bisector passing through the pair of cutting corners and an extension line of an intersection of a valley surface and a ridge surface of the front-turning rake surface is smaller than an angle between the corner bisector and an extension line of an intersection of a valley surface and a ridge surface of the back-turning rake surface.

10. The cutting insert of claim 8, wherein a plurality of dot portions spaced apart from each other along an extension direction of the minor cutting edge is formed on the back-turning rake surface.

11. The cutting insert of claim 10, wherein a distance between the minor cutting edge and each of the dot portions is smaller than a distance between the major cutting edge and a seat surface intersection of the front-turning rake surface.

12. The cutting insert of claim 8, wherein a front-turning chip former including a first groove surface inclined downward toward the mounting hole and a second groove surface connected to the first groove surface and inclined upward toward the mounting hole is formed on the front-turning rake surface, and
   a back-turning chip former including a third groove surface inclined downward toward the mounting hole and a fourth groove surface connected to the third groove surface and inclined upward toward the mounting hole is formed on the back-turning rake surface.

13. The cutting insert of claim 12, wherein the back-turning chip former has a length of at least ½ of a length of an edge of the third side surface meeting the upper surface.

14. The cutting insert of claim 12, wherein an inclination angle of the back-turning chip former with respect to the virtual reference plane is larger than an inclination angle of the front-turning chip former symmetrical to a corner bisector passing through the pair of cutting corners.

15. The cutting insert of claim 12, wherein a ramp distance of the back-turning chip former is set to be smaller than a ramp distance of the front-turning chip former symmetrical to a corner bisector passing through the pair of cutting corners.

16. The cutting insert of claim 1, wherein the major cutting edge has an entering angle of greater than 90° with respect to a workpiece, and wherein the minor cutting edge has an entering angle of less than 30° with respect to the workpiece.

17. The cutting insert of claim 1, wherein the upper surface and the lower surface are mirror-symmetrical about the virtual reference plane.

18. A cutting tool assembly for turning a workpiece, comprising:
   a cutting insert configured to be usable for both front-turning and high feed back-turning;
   a tool holder provided at a tip thereof with an insert pocket in which the cutting insert is mounted; and
   a fixing member configured to fix the cutting insert to the insert pocket of the tool holder,
   wherein the cutting insert includes an upper surface, a lower surface opposite to the upper surface in a vertical direction, a plurality of side surfaces positioned between the upper surface and the lower surface, and a plurality of cutting edges formed at edges where the plurality of side surfaces meet the upper surface,
   the upper surface and the lower surface are mirror-symmetrical about a virtual reference plane positioned between the upper surface and the lower surface and perpendicular to the vertical direction,
   the upper surface has a pair of cutting corners,
   the plurality of cutting edges include a major cutting edge used for front-turning and extending from each of the pair of cutting corners and a minor cutting edge used for high feed back-turning and extending from each of the pair of cutting corners,
   a representative inclination of the minor cutting edge is greater than a representative inclination of the major cutting edge with respect to the virtual reference plane, and
   the major cutting edge has an entering angle larger than 90° with respect to the workpiece, and the minor cutting edge has an entering angle smaller than 30° with respect to the workpiece.

19. The cutting tool assembly of claim 18, wherein the representative inclination of the major cutting edge is an inclination with respect to the virtual reference plane of a first imaginary line extending from each of the pair of cutting corners to a first vertical line passing through a half-length point of the major cutting edge, a sum of area of portions defined by the first imaginary line and the major cutting edge above the first imaginary line based on the first imaginary line is equal to a sum of areas of portions defined by the first imaginary line and the major cutting edge below the first imaginary line, wherein the representative inclination of the minor cutting edge is an inclination with respect to the virtual reference plane of a second imaginary line extending from each of the pair of cutting corners to a second vertical line passing through a half-length point of the minor cutting edge, and a sum of area of portions defined by the second imaginary line and the minor cutting edge above the second imaginary line based on the second imaginary line is equal to a sum of areas of portions defined by the second imaginary line and the minor cutting edge below the second imaginary line.

* * * * *